(12) United States Patent
Youn et al.

(10) Patent No.: US 7,803,023 B2
(45) Date of Patent: Sep. 28, 2010

(54) CONNECTOR FOR AUTOMOBILE WITH HIGH CURRENT CAPABILITY

(75) Inventors: Bok-Hee Youn, Incheon (KR); Wan-Ki Park, Gyeonggi-do (KR); Yong-Joon Noh, Gyeonggi-do (KR); Sei-Hoon Cho, Gyeonggi-do (KR)

(73) Assignee: LS Cable Ltd., Anyang (KR)

( * ) Notice: Subject to any disclaimer, the term of this patent is extended or adjusted under 35 U.S.C. 154(b) by 0 days.

(21) Appl. No.: 12/342,350

(22) Filed: Dec. 23, 2008

(65) Prior Publication Data
US 2009/0203267 A1 Aug. 13, 2009

(30) Foreign Application Priority Data
Dec. 28, 2007 (KR) .................. 10-2007-0140284

(51) Int. Cl.
*H01R 11/09* (2006.01)
(52) U.S. Cl. .................................................. 439/784
(58) Field of Classification Search ............... 439/784, 439/660, 186, 113, 681, 688, 489, 372, 357
See application file for complete search history.

(56) References Cited

U.S. PATENT DOCUMENTS

| | | | | |
|---|---|---|---|---|
| 3,287,031 A | * | 11/1966 | Simmons et al. | 285/27 |
| 4,531,798 A | * | 7/1985 | Baur et al. | 439/368 |
| 5,641,310 A | * | 6/1997 | Tiberio, Jr. | 439/680 |
| 6,203,349 B1 | | 3/2001 | Nakazawa | |
| 6,953,359 B1 | * | 10/2005 | Morelli | 439/319 |
| 7,214,094 B2 | * | 5/2007 | Kaminski et al. | 439/550 |
| 7,611,372 B2 | * | 11/2009 | Shen et al. | 439/372 |

FOREIGN PATENT DOCUMENTS

| | | |
|---|---|---|
| JP | 05-266951 | 10/1993 |
| JP | 11-339890 A | 12/1999 |

* cited by examiner

*Primary Examiner*—Jean F Duverne
(74) *Attorney, Agent, or Firm*—Jones Day

(57) ABSTRACT

A connector for an automobile with high current capability includes a circular terminal and a connector housing. The circular terminal is configured with a cylinder and has a slot formed in an outer periphery of the cylinder at one end and at least one projection formed on the outer periphery at the other end. The connector housing has a cylindrical space for receiving the circular terminal. The cylindrical space has an anti-separation protrusion formed on an inner periphery thereof and coupled with the slot of the circular terminal to prevent separation of the circular terminal. Also, the cylindrical space has at least one anti-rotation groove formed in the inner periphery thereof and engaged with the at least one projection of the circular terminal so as to prevent rotation of the circular terminal. This connector may keep the coupling between the circular terminal and the connector housing in a stable state.

6 Claims, 4 Drawing Sheets

CONNECTOR FOR AUTOMOBILE WITH HIGH CURRENT CAPABILITY

BACKGROUND OF THE INVENTION

1. Field of the Invention

The present invention relates to a connector with high current capability, and more particularly to a connector for an automobile with high current capability, which may keep a coupling between a connection terminal and a housing in a stable state.

2. Description of the Related Art

In recent, hybrid automobiles using an engine and a fuel cell in combination as a power source are developed and used. Such an automobile uses an electric output as a necessary power source, so high voltage and high current are inevitable. Also, in order to transmit such electric power source to various devices, many cables and connectors are used.

However, an automobile needs many parts to be loaded therein in addition to cables and connectors, so it is preferably to minimize a space occupied by cables and connectors.

Meanwhile, in case of a connector connected to a cable that transmits a high power as mentioned above, a gap between connector terminals should be kept wide so as to prevent an accident caused by dielectric strength, withstanding voltage or leakage current.

FIG. 1 shows a conventional connector.

Referring to FIG. 1, the conventional connector has a connection terminal with a flat plate shape. The connector has an elastically transformable lance structure in a connector housing 1, and a groove 6 is formed in the plate-shaped connection terminal 5 such that a protrusion 4 provided at the lance structure 3 may be received therein. By inserting the plate-shaped connection terminal 5 into the connector housing 1, the lance structure 3 is elastically transformed such that the protrusion 4 is mounted in the groove 6, and the plate-shaped connection terminal 5 is fixed to the connector housing 1.

The connector having such a plate-shaped connection terminal has a flat fixed surface, which ensures a firm engagement form, but its allowable current capability is not great. Thus, this connector is not suitable as a connector used for connecting a cable on which a large amount of current flows.

A connector used for connecting a cable on which a large amount of current is flowing adopts a connection terminal with a great size and a cylindrical structure in consideration of electric characteristics.

FIG. 2 shows a conventional connector having a cylindrical connection terminal.

The connector having a cylindrical connection terminal has a space in a connector housing 11 such that a cylindrical connection terminal 13 may be received therein, and the cylindrical connection terminal 13 connected to a cable is inserted and fixed in the space.

Here, the cylindrical connection terminal 13 has a curved outer periphery, so it is difficult to engage the cylindrical connection terminal 13 with the connector housing 11 by adopting an existing lance structure. As a result, an adhesive is applied to a local area of the cylindrical connection terminal 13, and then the cylindrical connection terminal 13 is permanently attached to the connector housing 11.

SUMMARY OF THE INVENTION

However, in case the cylindrical connection terminal 13 is coupled with the connector housing 11 using an adhesive, the cylindrical connection terminal 13 cannot be dissembled from the connector housing 11. Also, if heat or various vibrations are continuously applied to the connector, the adhesive is deteriorated, so a fixing force of the adhesive is decreased as time goes, and as a result the cylindrical connection terminal 13 is separated from the connector housing 11.

The present invention is designed to solve the problems of the prior art, and therefore it is an object of the present invention to provide a connector with high current capability, which is constructed to keep a coupling between a connector housing and a connection terminal in a stable state and ensure easy separation as necessary.

Another object of the present invention is to provide a connector capable of preventing a connector from rotating while the terminal is mounted to a housing in case the terminal adopts a cylindrical terminal for supplying high current to the connector.

Other objects and advantages of the present invention will be explained below, and they may be understood from embodiments of the present invention. Also, the objects and advantageous of the present invention may be realized using means defined in the appended claims or their combination.

In one aspect of the present invention, there is provided a connector for an automobile with high current capability, which includes a circular terminal configured with a cylinder and having a slot formed in an outer periphery of the cylinder at one end and at least one projection formed on the outer periphery at the other end; and a connector housing having a cylindrical space for receiving the circular terminal, the cylindrical space having an anti-separation protrusion formed on an inner periphery thereof and coupled with the slot of the circular terminal to prevent separation of the circular terminal, the cylindrical space having at least one anti-rotation groove formed in the inner periphery thereof and engaged with the at least one projection of the circular terminal so as to prevent rotation of the circular terminal.

Preferably, the anti-separation protrusion has a structure elastically transformable in a radial direction by an external force, whereby, as the circular terminal is inserted into the connector housing, the anti-separation protrusion is pulled back and placed in the slot.

In particular, the slot of the circular terminal may be formed at a front end of the cylinder coupled with the connector housing, and the projection may be formed at a rear end of the cylinder, which is opposite to the front end.

In addition, the number of the anti-rotation groove is preferably not less than the number of the projection. Also, the circular terminal preferably has a female contact portion to be coupled with a male contact portion.

Furthermore, a screw tap is preferably formed at a rear end of the circular terminal such that the circular terminal is coupled with another structure by a bolt.

BRIEF DESCRIPTION OF THE DRAWINGS

Other objects and aspects of the present invention will become apparent from the following description of embodiments with reference to the accompanying drawing in which.

REFERENCE NUMERALS OF ESSENTIAL PARTS IN THE DRAWINGS

Figure 1:
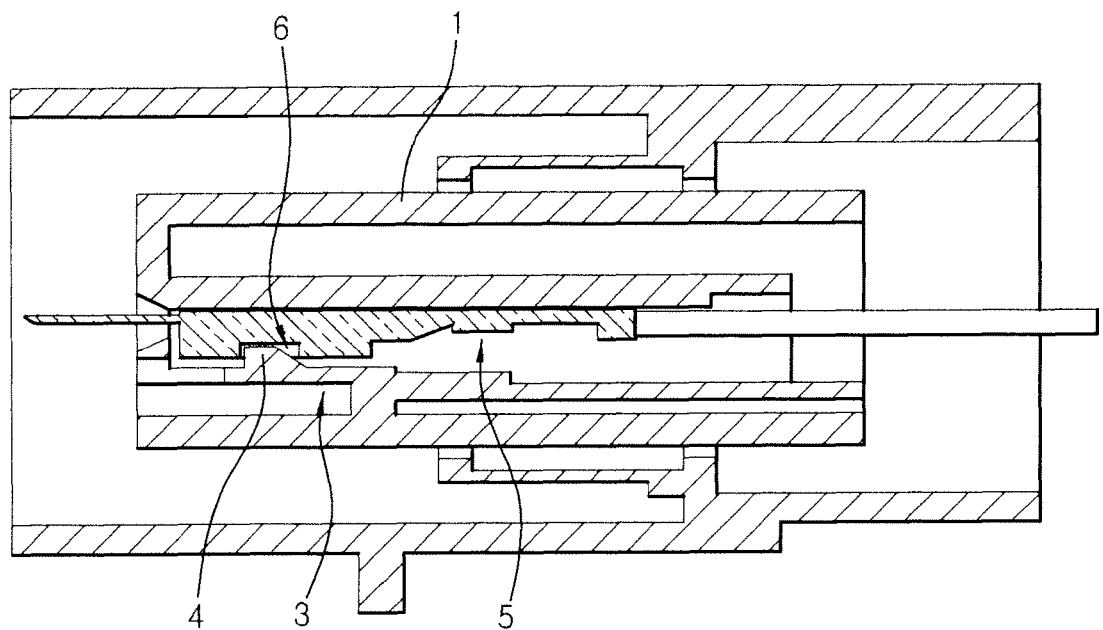
FIG. 1 shows a conventional connector.
Figure 2:
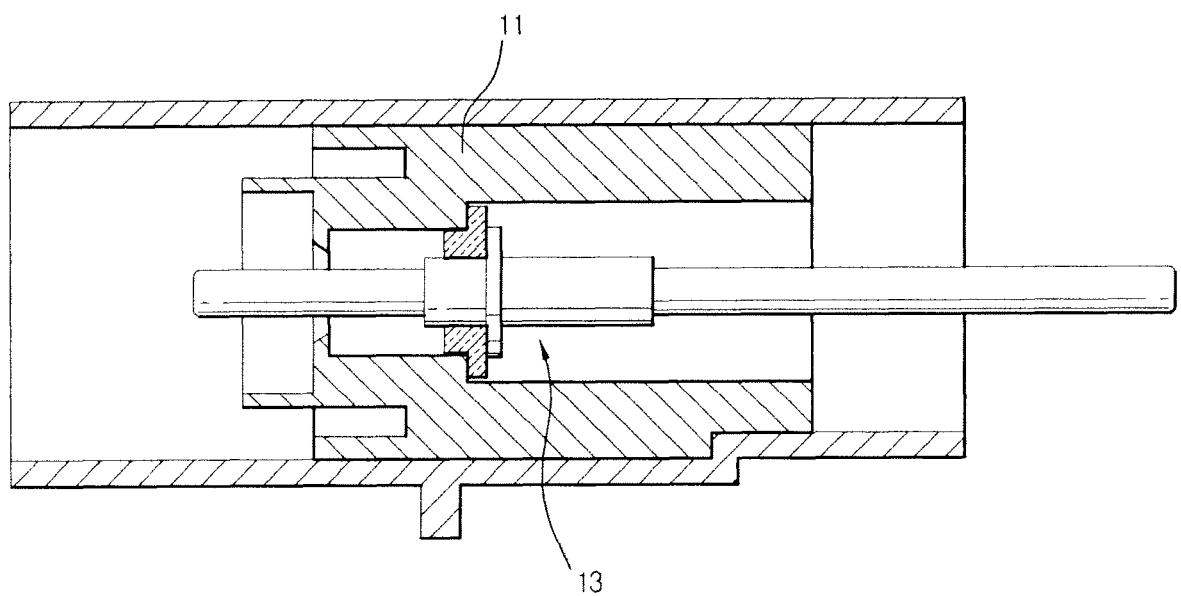
FIG. 2 shows a conventional connector having a cylindrical connection terminal.

100: circular terminal
110: anti-rotation projection
120: lance slot
130: screw tap
140: contact member
200: connector housing
210: anti-rotation groove
230: lance unit

DESCRIPTION OF THE PREFERRED EMBODIMENT

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the invention, so it should be understood that other equivalents and modifications could be made thereto without departing from the spirit and scope of the invention.

Figure 3:
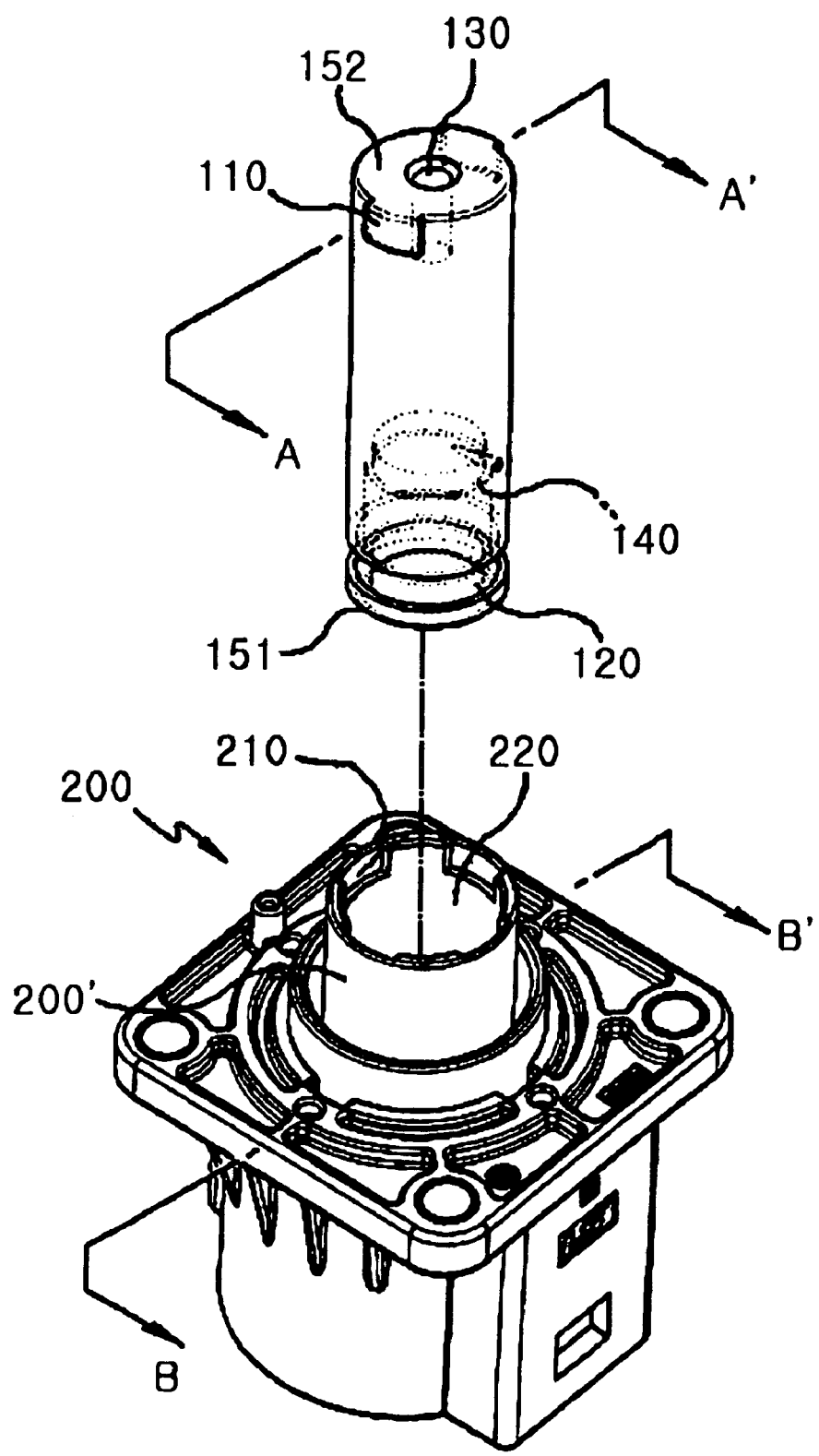
FIG. 3 is a perspective view showing a connector for an automobile with high current capability according to one embodiment of the present invention.
Figure 4:
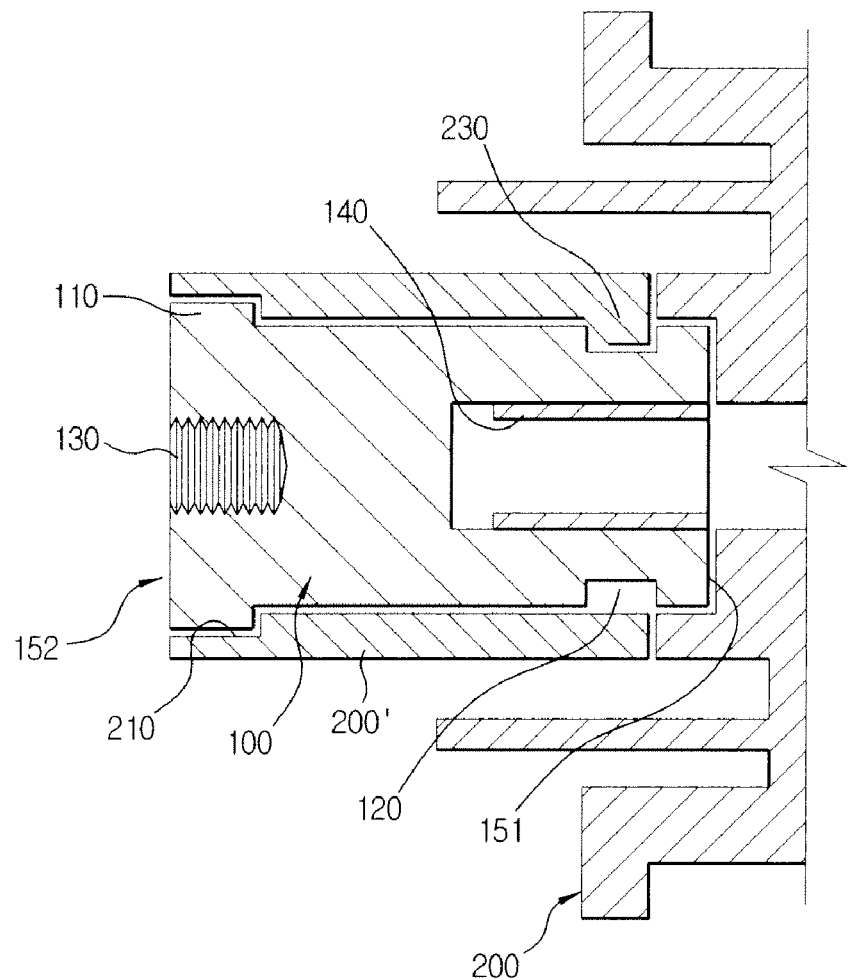
FIG. 4 is a sectional view showing that a circular terminal of the connector for an automobile with high current capability according to one embodiment of the present invention is mounted to a housing.

FIG. 3 is a perspective view showing a connector for an automobile with high current capability according to one embodiment of the present invention, and FIG. 4 is a sectional view showing that a circular terminal of the connector for an automobile with high current capability according to one embodiment of the present invention is mounted to a housing.

Referring to FIGS. 3 and 4, the connector for an automobile with high current capability according to the present invention includes a connector housing 200 having a space into which a terminal may be inserted, and a circular terminal 100 having a cylindrical shape.

The connector housing 200 is a housing of a connector for an automobile with high current capability using a circular terminal, and the connector housing 200 includes a housing body 200' having an inner space, a lance unit 230 for fixing a terminal, and an anti-rotation groove 210 for preventing rotation of the terminal.

The housing body 200' receives components provided at cables and connectors, and the housing body 200' has an inner space such that the circular terminal 100 may be inserted therein. The inner space of the housing body 200' has a cylindrical inner periphery 220 to correspond to the shape of the circular terminal such that the circular terminal 100 may be inserted and mounted therein. Also, the housing body 200' is made of insulating material, and it keeps insulation when the terminal is in a coupled state.

The lance unit 230 is positioned on the inner periphery of the housing body 200' into which the terminal is inserted, and the lance unit 230 plays a role of fixing the inserted terminal not to be separated, namely an anti-separation function. The lance unit 230 is positioned at the rear of an entrance of the inner space into which the terminal is inserted. Also, the lance unit 230 is formed as a protrusion on the inner periphery 220 and elastically transformed so as to be mounted in a lance slot 120 formed in the terminal when the terminal is inserted. In addition, it is also possible that a plurality of lance units 230 are provided.

The anti-rotation groove 210 is used for preventing the circular terminal 100 inserted into the cylindrical inner periphery 220 from freely rotating, and the anti-rotation groove 210 is composed of one groove engaged with an anti-rotation projection 110 provided on the circular terminal 100. Also, the anti-rotation groove 210 is positioned at the entrance of the inner space into which the terminal is inserted. Preferably, the anti-rotation groove 210 is positioned to contact with an open surface in which the terminal is inserted, and thus the anti-rotation projection 110 provided at the terminal is inserted into the anti-rotation groove 210 when the terminal is inserted.

The circular terminal 100 is a cylindrical terminal mounted to the housing body 200', and the circular terminal 100 is composed of a contact member 140, a lance slot 120 corresponding to the lance unit 230, and an anti-rotation projection 110 for preventing rotation deformation, and a screw tap 130.

The contact member 140 has a contact structure to receive a male circular terminal therein and thus to form an electric contact. The contact member 140 has a circular shape to receive a cylindrical male terminal, and the contact member 140 is positioned on an inner surface toward an entrance surface 151 of the circular terminal 100.

The screw tap 130 is positioned on an opposite surface 152 to the entrance surface 151 of the circular terminal 100, and the screw tap 130 plays a role of allowing a bus bar-type or cable-type connector to be assembled by a bolt. Namely, the screw tap 130 is used for assembling the circular terminal 100 to a bus bar or a cable by a bolt after the circular terminal 100 is inserted into the housing body 200'.

The lance slot 120 is formed along an outer diameter of a cylindrical outer periphery of the circular terminal 100 with a predetermined depth. The lance slot 120 receives the lance unit 230 of the housing body 200' to fix and couple the housing body 200' to the circular terminal 100. Namely, if the circular terminal 100 is inserted into the housing body 200', the lance unit 230 is placed in and coupled to the lance slot 120, thereby preventing the inserted circular terminal 100 from being additionally inserted or separated. Preferably, the lance slot 120 is positioned in the outer periphery of the circular terminal 100 toward the entrance surface 151.

The anti-rotation projection 110 is composed of at least one projection formed on the cylindrical outer periphery of the circular terminal 100 with a predetermined thickness. The anti-rotation projection 110 has a protruded structure corresponding to the anti-rotation groove 210. Namely, as the circular terminal 100 is inserted into the housing body 200', the anti-rotation projection 110 is placed into the anti-rotation groove 210. Accordingly, in the state that the circular terminal 100 is inserted into the housing body 200', it is prevented that the circular terminal 100 freely rotates in a circumferential direction. Preferably, the anti-rotation projection 110 is positioned on the other surface 152 of the circular terminal 100 opposite to the entrance surface 151, namely on the outer periphery of the circular terminal 100. Also, it is preferred that the number of anti-rotation projections 110 is not greater than the number of anti-rotation grooves 210.

Figure 5:
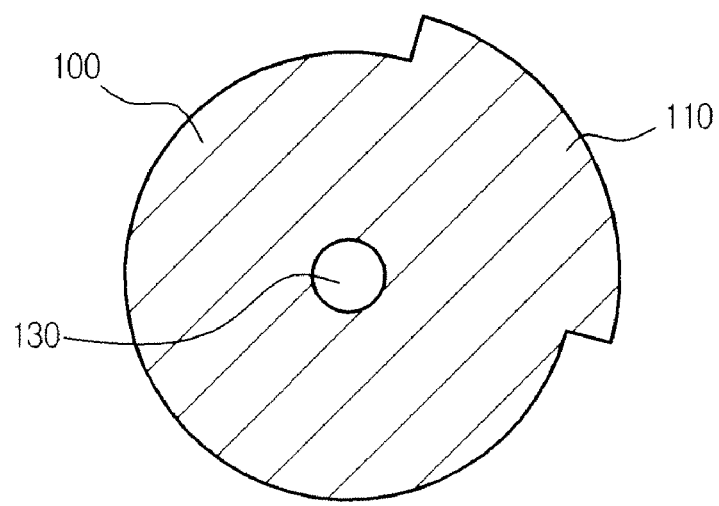
FIG. 5 is a sectional view showing another embodiment of an anti-rotation projection formed on the circular terminal, taken along the line A-A' of FIG. 3.
Figure 6:
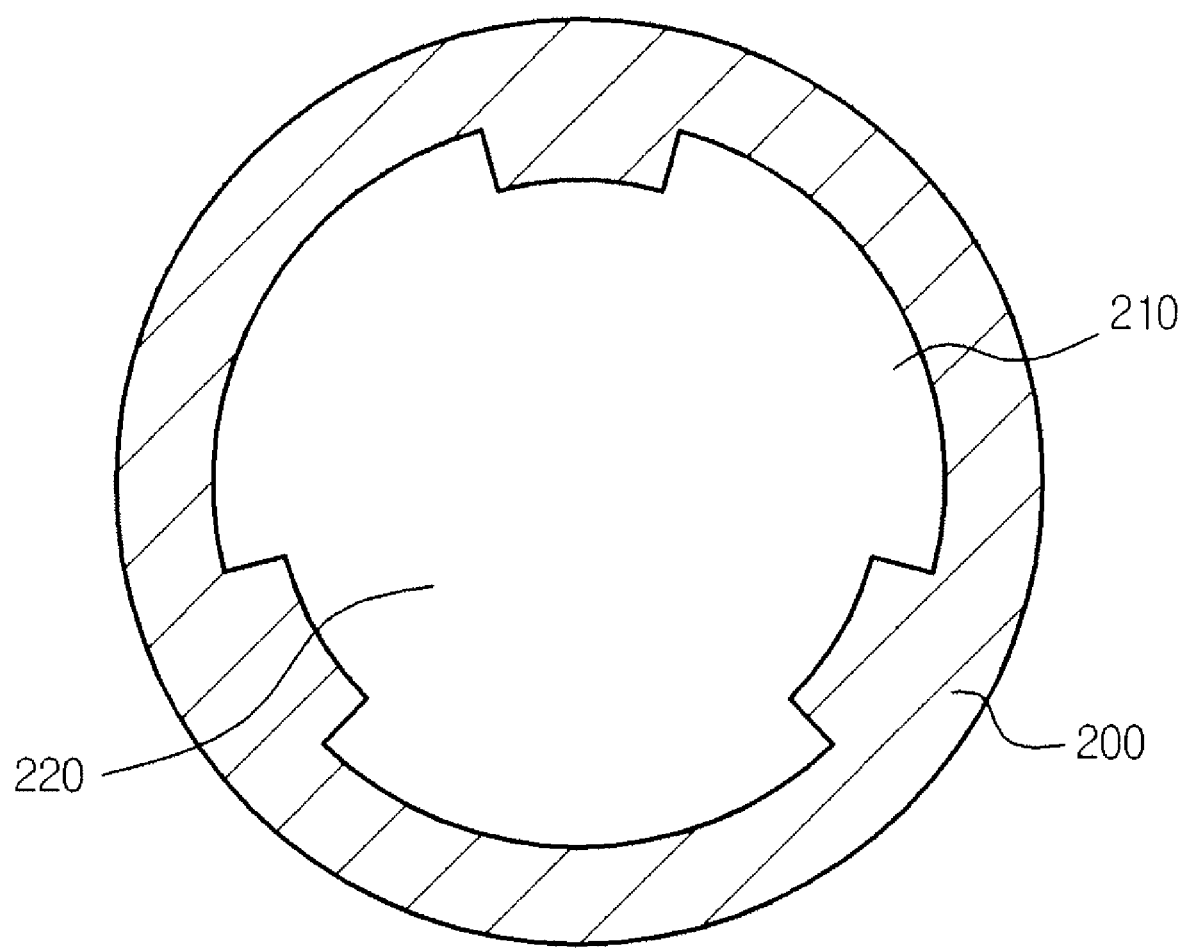
FIG. 6 is a sectional view showing another embodiment of an anti-rotation groove formed in a connector housing, taken along the line A-A' of FIG. 3.

In FIG. 4, it is shown that four anti-rotation grooves 210 and two anti-rotation projections 110 are formed. However, the present invention is not limited to such shape and number, but various projection and groove structures may be used if the terminal is not rotated while the circular terminal may be inserted into the housing. FIGS. 5 and 6 show such modifications.

FIG. 5 is a sectional view showing another embodiment of an anti-rotation projection formed on the circular terminal, taken along the line A-A' of FIG. 3, and FIG. 6 is a sectional view showing another embodiment of an anti-rotation groove formed in a connector housing, taken along the line A-A' of FIG. 3.

As shown in FIG. 5, the anti-rotation projection 110 of the present invention may be configured with only one projection 110. Also, as shown in FIG. 6, the anti-rotation groove 210 of the present invention may be configured with three grooves 210. However, even in this case, one projection 110 should be corresponding to three grooves 210 in their shapes. Namely, one projection 110 should be placed and inserted to any one selected from three grooves 210.

Hereinafter, an assembling process of the connector for an automobile with high current capability according to one embodiment of the present invention is explained with reference to the components described above.

First, the entrance surface 151 of the circular terminal 100 is inserted into the inner space of the connector housing 200. Then, the outer periphery of the circular terminal 100 is inserted and moved along the inner periphery of the inner space of the connector housing 200. Along with the insertion and movement, the lance unit 230 provided at the inner periphery of the connector housing 200 is elastically transformed and pulled back, and then the lance unit 230 is placed and fixed in the lance slot 120 when the circular terminal 100 is completely inserted. At this time, the anti-rotation projection 110 of the circular terminal 100 is engaged with the anti-rotation groove 210 of the connector housing 200. Thus, the lance unit 230 is coupled with the lance slot 120, thereby preventing the circular terminal 100 from being separated from the connector housing 200. In addition, since the anti-rotation projection 110 is engaged with the anti-rotation groove 210, it is prevented that the circular terminal 100 is arbitrarily rotated or deformed.

Subsequently, after the circular terminal 100 is inserted and mounted in the connector housing 200, a bus bar or a cable is assembled and connected to the screw tap 130 of the circular terminal 100 by a bolt, and a male circular terminal is inserted into the entrance surface 151 of the circular terminal 100 and thus electrically connected to the circular terminal 100 by the contact member 140.

The present invention has been described in detail. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A connector for an automobile with high current capability, comprising:

a circular terminal configured with a cylinder and having a slot formed in an outer periphery of the cylinder at one end and at least one projection formed on the outer periphery at the other end; and a connector housing having a cylindrical space for receiving the circular terminal, the cylindrical space having an anti-separation protrusion formed on an inner periphery thereof and coupled with the slot of the circular terminal to prevent separation of the circular terminal, the cylindrical space having at least one anti-rotation groove formed in the inner periphery thereof and engaged with the at least one projection of the circular terminal so as to prevent rotation of the circular terminal.

2. The connector for an automobile with high current capability according to claim 1, wherein the anti-separation protrusion has a structure elastically transformable in a radial direction by an external force, whereby, as the circular terminal is inserted into the connector housing, the anti-separation protrusion is pulled back and placed in the slot.

3. The connector for an automobile with high current capability according to claim 2, wherein the slot of the circular terminal is formed at a front end of the cylinder coupled with the connector housing, and the projection is formed at a rear end of the cylinder, which is opposite to the front end.

4. The connector for an automobile with high current capability according to claim 3, wherein the number of the anti-rotation groove is not less than the number of the projection.

5. The connector for an automobile with high current capability according to claim 4, wherein the circular terminal has a female contact portion to be coupled with a male contact portion.

6. The connector for an automobile with high current capability according to claim 5, wherein a screw tap is formed at a rear end of the circular terminal such that the circular terminal is coupled with another structure by a bolt.

* * * * *